United States Patent
Li et al.

(10) Patent No.: US 12,272,848 B2
(45) Date of Patent: Apr. 8, 2025

(54) FUEL CELL, FUEL CELL STACK, MANUFACTURING METHOD OF FUEL CELL AND MANUFACTURING METHOD OF FUEL CELL STACK

(71) Applicant: TAIYO YUDEN CO., LTD., Tokyo (JP)

(72) Inventors: Xinyu Li, Takasaki (JP); Chie Kawamura, Takasaki (JP); Yukihiro Konishi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 212 days.

(21) Appl. No.: 16/657,760

(22) Filed: Oct. 18, 2019

(65) Prior Publication Data

US 2020/0144645 A1 May 7, 2020

(30) Foreign Application Priority Data

Nov. 1, 2018 (JP) .................................. 2018-206798

(51) Int. Cl.
*H01M 8/1004* (2016.01)
*H01M 4/86* (2006.01)
(Continued)

(52) U.S. Cl.
CPC ........... *H01M 8/1004* (2013.01); *H01M 4/86* (2013.01); *H01M 4/8605* (2013.01);
(Continued)

(58) Field of Classification Search
None
See application file for complete search history.

(56) References Cited

U.S. PATENT DOCUMENTS

| | | | |
|---|---|---|---|
| 4,598,467 A * | 7/1986 | Isenberg | H01M 8/12 29/623.5 |
| 6,025,084 A * | 2/2000 | Kawasaki | B01D 53/326 429/456 |

(Continued)

FOREIGN PATENT DOCUMENTS

| | | |
|---|---|---|
| CN | 101795756 A | 8/2010 |
| DE | 202013105228 U1 | 11/2013 |

(Continued)

OTHER PUBLICATIONS

Zheng, Yao et al, A new symmetric solid-oxide fuel cell with La0.8Sr0.2Sc0.2Mn0.8O3-d perovskite oxide as both the anode and cathode, Elseviert Ltd., Acta Materialia Inc., Dec. 4, 2008, p. 1165-1175 (Year: 2008).*

(Continued)

*Primary Examiner* — Ula C Ruddock
*Assistant Examiner* — Mary Grace Byram
(74) *Attorney, Agent, or Firm* — Law Office of Katsuhiro Arai

(57) ABSTRACT

A fuel cell includes: a solid oxide electrolyte layer having oxygen ion conductivity; a first electrode layer that is provided on a first face of the solid oxide electrolyte layer; and a second electrode layer that is provided on a second face of the solid oxide electrolyte layer, wherein a main component of a material having oxygen ion conductivity and a main component of a material having electron conductivity are common with each other between the first electrode layer and the second electrode layer.

8 Claims, 4 Drawing Sheets

(51) Int. Cl.
*H01M 8/0226* (2016.01)
*H01M 8/0232* (2016.01)
*H01M 8/0247* (2016.01)
*H01M 8/12* (2016.01)
*H01M 8/1253* (2016.01)
*H01M 8/2404* (2016.01)
*H01M 8/2428* (2016.01)
*H01M 8/2485* (2016.01)
*H01M 4/88* (2006.01)
*H01M 8/0258* (2016.01)
*H01M 8/0273* (2016.01)
*H01M 8/2425* (2016.01)

(52) U.S. Cl.
CPC ....... *H01M 8/0226* (2013.01); *H01M 8/0232* (2013.01); *H01M 8/0247* (2013.01); *H01M 8/12* (2013.01); *H01M 8/1253* (2013.01); *H01M 8/2404* (2016.02); *H01M 8/2428* (2016.02); *H01M 8/2485* (2013.01); *H01M 4/8889* (2013.01); *H01M 8/0258* (2013.01); *H01M 8/0273* (2013.01); *H01M 2008/1293* (2013.01); *H01M 8/2425* (2013.01); *H01M 2250/20* (2013.01)

(56) References Cited

U.S. PATENT DOCUMENTS

| | | | | |
|---|---|---|---|---|
| 6,296,963 B1* | 10/2001 | Nanjo | ................ | H01M 8/2432 |
| | | | | 429/456 |
| 2001/0026884 A1* | 10/2001 | Appleby | ............... | F28F 13/003 |
| | | | | 429/492 |
| 2001/0044043 A1* | 11/2001 | Badding | ............. | H01M 4/9066 |
| | | | | 429/488 |
| 2004/0200187 A1* | 10/2004 | Warrier | ............... | H01M 8/2432 |
| | | | | 52/782.1 |
| 2005/0053819 A1* | 3/2005 | Paz | .................... | H01M 8/0612 |
| | | | | 429/468 |
| 2005/0221163 A1* | 10/2005 | Yang | .................. | H01M 4/8647 |
| | | | | 204/192.15 |
| 2006/0113034 A1* | 6/2006 | Seabaugh | ............. | C04B 35/486 |
| | | | | 156/308.2 |
| 2006/0199058 A1* | 9/2006 | Hiwatashi | ........... | H01M 8/1253 |
| | | | | 429/535 |
| 2006/0280998 A1* | 12/2006 | Ying | ....................... | H01M 4/90 |
| | | | | 429/425 |
| 2007/0269701 A1* | 11/2007 | Larsen | ................ | H01M 8/0243 |
| | | | | 429/489 |
| 2008/0038611 A1* | 2/2008 | Sprenkle | ............. | H01M 4/8885 |
| | | | | 429/495 |
| 2009/0061279 A1 | 3/2009 | Larsen | | |
| 2010/0167164 A1 | 7/2010 | Reilly et al. | | |
| 2011/0132772 A1 | 6/2011 | Hendriksen et al. | | |
| 2012/0021332 A1* | 1/2012 | Hwang | ............... | H01M 4/9066 |
| | | | | 429/495 |
| 2012/0094204 A1* | 4/2012 | Dano | .................. | H01M 8/2457 |
| | | | | 429/457 |
| 2014/0140077 A1 | 5/2014 | Wang | | |
| 2015/0056537 A1* | 2/2015 | Yagi | ...................... | H01M 8/006 |
| | | | | 429/495 |
| 2016/0197359 A1* | 7/2016 | Tomoshige | ......... | H01M 8/0297 |
| | | | | 429/465 |
| 2019/0044159 A1* | 2/2019 | Miyamoto | .............. | H01M 4/86 |
| 2019/0198901 A1* | 6/2019 | Fan | ....................... | H01M 4/926 |
| 2021/0143448 A1* | 5/2021 | Blackburn | ............ | H01M 8/222 |

FOREIGN PATENT DOCUMENTS

| | | |
|---|---|---|
| JP | 2004327413 A | 11/2004 |
| JP | 2008108466 A | 5/2008 |
| JP | 2009059697 A | 3/2009 |
| JP | 2012190746 A | 10/2012 |
| JP | 5539391 B2 | 7/2014 |
| JP | 5686190 B2 | 3/2015 |
| JP | 2016207630 A | 12/2016 |
| JP | 2018037329 A | 3/2018 |
| JP | 2018055946 A | 4/2018 |

OTHER PUBLICATIONS

Tucker, Michael C., Development of High Power Density Metal-Supported Solid Oxide Fuel Cells, May 24, 2017, Energy Technol. 2017, 5, 2175-2181 (Year: 2017).*

Ametek Specialty Metal Products, 434L Powder Stainless Steel Technical Data Sheet, 2020 (Year: 2020).*

Fones, Andrew et al, Final Analysis: Effects of Platinum Group Metals Doping on Stainless Steels, Platinum Metals Rev., 2014, 58, (1), 54-57 (Year: 2014).*

Alan F. Jankowski et al 1999 Proc. vol. 1999-19 932 (Year: 1999).*

A Notification of Reasons for Refusal issued by the Japanese Patent Office, mailed Oct. 4, 2022, for Japanese counterpart application No. 2018-206798. (5 pages).

A First Office Action issued by the State Intellectual Property Office of China on Oct. 18, 2023, for Chinese counterpart application No. 201911035694.1 (7 pages).

* cited by examiner

FUEL CELL, FUEL CELL STACK, MANUFACTURING METHOD OF FUEL CELL AND MANUFACTURING METHOD OF FUEL CELL STACK

CROSS-REFERENCE TO RELATED APPLICATION

This application is based upon and claims the benefit of priority of the prior Japanese Patent Application No. 2018-206798, filed on Nov. 1, 2018, the entire contents of which are incorporated herein by reference.

FIELD

A certain aspect of the present invention relates to a fuel cell, a fuel cell stack, a manufacturing method of a fuel cell and a manufacturing method of a fuel cell stack.

BACKGROUND

Solid oxide fuel cells of metal support type are being developed as solid oxide fuel cells which can be used for cars (for example, see Japanese Patent Application Publication No. 2018-37329 and Japanese Patent Application Publication No. 2016-207630).

SUMMARY OF THE INVENTION

However, a space of a car for mounting a fuel cell is very small. It is therefore requested that the fuel cell is downsized.

The present invention has a purpose of providing a fuel cell, a fuel cell stack that can be downsized, and manufacturing methods of them.

According to an aspect of the present invention, there is provided a fuel cell including: a solid oxide electrolyte layer having oxygen ion conductivity; a first electrode layer that is provided on a first face of the solid oxide electrolyte layer; and a second electrode layer that is provided on a second face of the solid oxide electrolyte layer, wherein a main component of a material having oxygen ion conductivity and a main component of a material having electron conductivity are common with each other between the first electrode layer and the second electrode layer.

According to another aspect of the present invention, there is provided a fuel cell stack including a plurality of above-mentioned fuel cells stacked through a separator of a metal.

According to another aspect of the present invention, there is provided a manufacturing method of a fuel cell including: preparing a multilayer structure in which a first electrode layer including powder of a material having oxygen ion conductivity, powder of a material having electron conductivity, and a binder is stacked on a first face of an electrolyte layer including powder of a material having oxygen ion conductivity, and a second electrode layer including powder of a material having oxygen ion conductivity, powder of a material having electron conductivity and a binder is stacked on a second face of the electrolyte layer; and firing the multilayer structure, wherein a main component of a material having oxygen ion conductivity and a main component of a material having electron conductivity are common with each other between the first electrode layer and the second electrode layer.

According to another aspect of the present invention, there is provided a manufacturing method of a fuel cell stack including: preparing a compact in which a plurality of multilayer structures are stacked, each of the plurality of multilayer structures having a structure in which a first electrode layer including powder of a material having oxygen ion conductivity, powder of a material having electron conductivity and a binder, and a first metal powder layer including an extinction material and metal powder are stacked on a first face of an electrolyte layer including powder having oxygen ion conductivity in this order, and a second electrode layer including powder of a material having oxygen ion conductivity, powder having electron conductivity and a binder, and a second metal powder layer including an extinction material and metal powder are stacked on a second face of the electrolyte layer in this order, a third metal powder layer being provided between each two of the plurality of multilayer structures next to each other; and firing the compact, wherein a main component of a material having oxygen ion conductivity and a main component of a material having electron conductivity are common with each other between the first electrode layer and the second electrode layer.

DETAILED DESCRIPTION

A description will be given of an embodiment with reference to the accompanying drawings.

Figure 1:
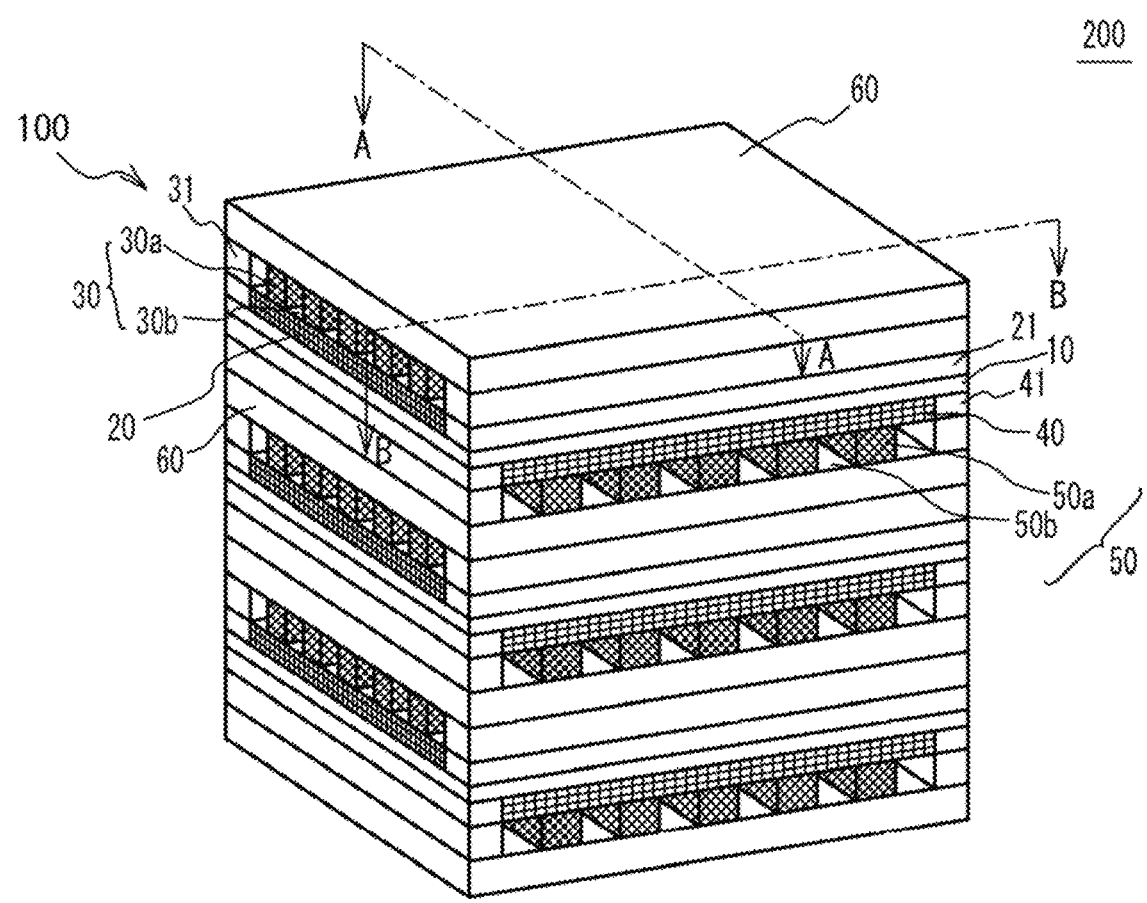
FIG. 1 illustrates an external perspective view of a fuel cell stack.
Figure 2A:
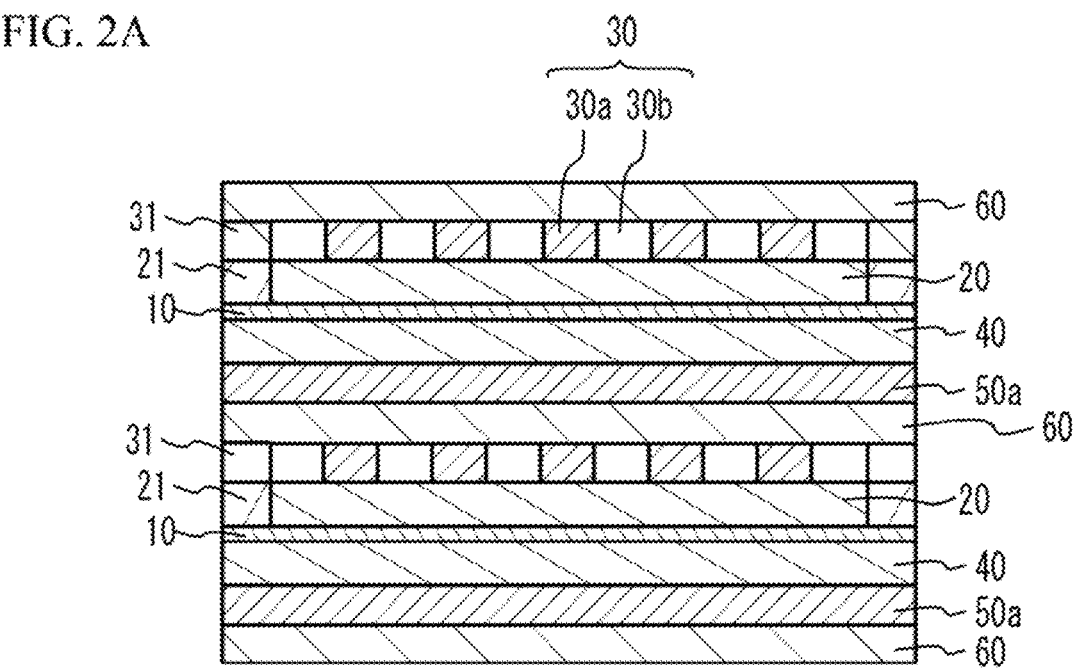
FIG. 2A illustrates a cross sectional view taken along a lune A-A of FIG. 1.
Figure 2B:
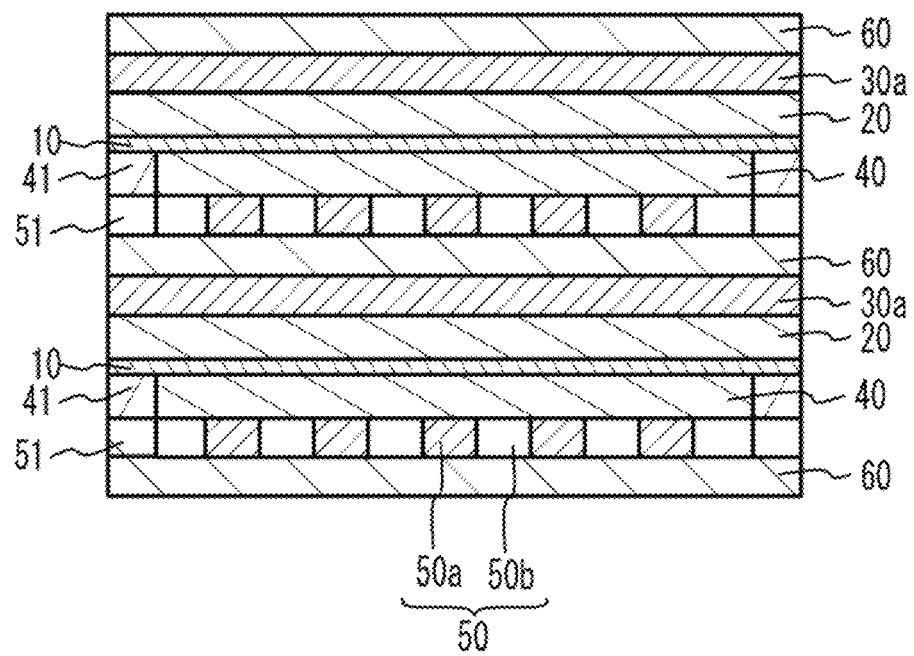
FIG. 2B illustrates a cross sectional view taken along a line B-B of FIG. 1.

FIG. 1 illustrates an external perspective view of a fuel cell stack 200. FIG. 2A illustrates a cross sectional view taken along a lune A-A of FIG. 1. FIG. 2B illustrates a cross sectional view taken along a line B-B of FIG. 1.

As illustrated in FIG. 1, the fuel cell stack 200 has a structure in which a plurality of fuel cells 100 are stacked. The fuel cell 100 has a structure in which a cathode 20 (first electrode layer) and a first metal porous layer 30 are stacked on an upper face (first face) of a solid oxide electrolyte layer 10 in this order, and an anode 40 (second electrode layer) and a second metal porous layer 50 are stacked on a lower face (second face) of the solid oxide electrolyte layer 10 in this order. The first metal porous layer 30 has a metal porous part 30a and a gas passage 30b. The second metal porous layer 50 has a metal porous part 50a and a gas passage 50b. A separator 60 is provided between each two of the fuel cells 100 next to each other. In the fuel cell stack 200, a combination of the solid oxide electrolyte layer 10, the cathode 20 and the anode 40 may be referred to as a cell. A combination of the first metal porous layer 30, the separator 60 and the second metal porous layer 50 may be referred to as an interconnector.

The solid oxide electrolyte layer 10 is a dense layer of solid oxide electrolyte having oxygen ion conductivity. The cathode 20 is an electrode having electrode activity as a cathode. The cathode 20 has electron conductivity and oxygen ion conductivity. The anode 40 is an electrode having electrode activity as an anode. The anode 40 has electron conductivity and oxygen ion conductivity. The first metal porous layer 30 and the second metal porous layer 50 have gas permeability and support the solid oxide electrolyte layer 10. The separator 60 is a dense metal layer and has non gas-permeability.

The fuel cell 100 generates electrical power by the following operation. Oxidant gas including oxygen such as air is supplied to the metal porous part 30*a* and the gas passage 30*b*. The oxidant gas reaches the cathode 20 via the metal porous part 30*a* and the gas passage 30*b*. In the cathode 20, the oxygen in the cathode 20 reacts with an electron supplied from an external electrical circuit and becomes an oxygen ion. The oxygen ion conducts through the solid oxide electrolyte layer 10 and moves toward the anode 40. On the other hand, fuel gas including hydrogen such as hydrogen gas or reformed gas is supplied to the metal porous part 50*a* and the gas passage 50*b*. The fuel gas reaches the anode 40 via the metal porous part 50*a* and the gas passage 50*b*. The hydrogen in the anode 40 releases an electron, reacts with the oxygen ion having conducted through the solid oxide electrolyte layer 10 from the cathode 20, and becomes water ($H_2O$). A released electron is extracted outward by an external electrical circuit. The extracted electron electrically works, and then is supplied to the cathode 20. With the operation, the electrical power is generated.

The solid oxide electrolyte layer 10, the cathode 20, the first metal porous layer 30, the anode 40 and the second metal porous layer 50 have a rectangular shape having approximately the same size. Therefore, the solid oxide electrolyte layer 10, the cathode 20, the first metal porous layer 30, the anode 40 and the second metal porous layer 50 form a rectangular parallelepiped shape. In the rectangular parallelepiped shape, among four side faces other than an upper face and a lower face, a pair of two side faces facing with each other are referred to as a first side face and a second side face. The other pair of two side faces facing with each other are referred to as a third side face and a fourth side face.

As illustrated in FIG. 2A, frames 21 are provided on the first side face and the second side face of the cathode 20. Frames 31 are provided on the first side face and the second side face of the first metal porous layer 30. The frames 21 and the frames 31 act as sealing members. Therefore, a passage of the oxidant gas is demarcated by the frames 21, the frames 31, and the separator 60 contacting to the first metal porous layer 30. Thus, in the first metal porous layer 30, the oxidant gas moves from one of the third side face and the fourth side face to the other.

As illustrated in FIG. 2B, frames 41 are provided on the third side face and the fourth side face of the anode 40. Frames 51 are provided on the third side face and the fourth side face of the second metal porous layer 50. The frames 41 and the frames 51 act as sealing members. Therefore, a fuel gas passage is demarcated by the frames 41, the frames 51, and the separator 60 contacting to the second metal porous layer 50. Thus, in the second metal porous layer 50, the fuel gas moves from one of the first side face and the second side face to the other.

Here, a description will be given of a solid oxide fuel cell of a metal support type in which peripheral components such as an electric collector, a gas diffusion board, an interconnector and so on are metal members made by heading or forging, and a cell including a cathode, an anode and an electrolyte film is supported by the peripheral components. A volume of the peripheral components is large in the solid oxide fuel cell. It is therefore difficult to downsize the solid oxide fuel cell. For example, a volume of an SOFC system of 1 kW is approximately 1000 $cm^3$. Approximately 30 units, each of which includes the cell (10×10 $cm^2$) and peripheral components are stacked in a vertical direction. An average thickness of the units is 3.3 mm. From a viewpoint of downsizing the system, it is preferable that the peripheral components have a small thickness. However, the peripheral components are made by the heading or the forging. It is preferable that the peripheral components are made in millimeter order from a viewpoint of handling the peripheral components. It is difficult to further reduce the thickness of the peripheral components.

And so, it is thought that the volume of the system is largely reduced by making the peripheral components in μm order by using printing technology and lot firing technology. For example, it is thought that a porous metal such as the metal porous part 30*a* or the metal porous part 50*a* is formed by firing metal powder, and the porous metal is used instead of the peripheral components. However, when a material of the cathode 20 is different from that of the anode 40, mismatch of contraction of the cathode 20 and the anode 40 may occur and crack may occur when removing a binder during firing of the cathode 20 and the anode 40.

And so, the fuel cell 100 has a structure for suppressing crack during the firing process. In concrete, a main component of a material having electron conductivity of the cathode 20 is common with a main component of a material having electron conductivity of the anode 40. Moreover, a main component of a material having oxygen ion conductivity of the cathode 20 is common with a main component of a material having oxygen ion conductivity of the anode 40. With the structure, materials of the cathode 20 are similar to materials of the anode 40. Therefore, during removing a binder in the firing process of the cathode 20 and the anode 40, bias of the contraction stress of the cathode 20 and the anode 40 is suppressed and the crack is suppressed. It is therefore possible to form a cell part including the solid oxide electrolyte layer 10, the cathode 20 and the anode 40, by a printing technology and a one lot firing technology. Therefore, the fuel cell 100 can be downsized. When the fuel cell 100 is downsized, it is possible to increase the number of stacks. Thereby, desirable amount of electrical power can be achieved.

For example, it is thought that a material having both of the electron conductivity and the oxygen ion conductivity (an electron and oxygen ion conductive material) is used. For example, the electron and oxygen ion conductive material is such as a $LaMnO_3$-based material, a $LaCoO_3$-based material or the like. However, in the one lot firing process, metal powder of the first metal porous layer 30 and the second metal porous layer 50 are fired together with the cathode 20 and the anode 40. Therefore, it is preferable that firing atmosphere is reductive atmosphere. When the $LaMnO_3$-based material or the $LaCoO_3$-based material is used as a main component of the electron and oxygen ion conductive material, it is difficult to fire the electron and oxygen ion conductive material in a reductive atmosphere although favorable performance of generating electrical power is achieved. And so, it is preferable that the main component of the electron and oxygen ion conductive material has resistance against reduction. For example, a $CeO_2$-based material in which Gd is doped, or the like may be used as the main component of the electron and oxygen ion conductive material.

The electron and oxygen ion conductivity may be totally achieved, by using a material having electron conductivity and another material having oxygen ion conductivity, as another method. The material having the oxygen ion conductivity is not limited. For example, it is preferable that scandia yttria stabilized zirconia (ScYSZ) is used as the main component of the material having the oxygen ion conductivity. For example, it is preferable that ScYSZ having a composition range including 5 mo % to 16 mol % of scandia ($Sc_2O_3$) and 1 mol % to 3 mol % of yttria ($Y_2O_3$) is used. It is more preferable that ScYSZ of which a total amount of the scandia and the yttria is 6 mol % to 15 mol % is used. This is because the highest conductivity of oxygen ion is achieved in the range. The material having the oxygen ion conductivity is a material of which a transport number of oxygen ion is 99% or more.

Next, the material having the electron conductivity is not limited. A metal such as Ni may be used as the material having the electron conductivity. It is preferable that the material having the electron conductivity may be an alloy including one or more of C, Si, Y, Ce, Cr, Fe, Ti, Cu, Mn, La, W, Ni or Zr, and 10 wt % to 95 wt % of Cr, and 30 wt % or less of another element. In concrete, it is preferable that Fe-18 to 22 Cr alloy is used. When the metal of the alloy is used, an SOFC system has large mechanical strength and has resistance against rapid temperature changing. With the characteristic, it is possible to mount the fuel system in a vehicle. When an amount of Cr is increased in the alloy, a thermal expansion coefficient of the cathode 20 and the anode 40 gets closer to a thermal expansion coefficient of the solid oxide electrolyte layer 10. Therefore, the cell has resistance against crack. Moreover, when the amount of Cr of the alloy is large, the alloy has resistance against heat. Therefore, degradation of the cell during generating electrical power is suppressed. However, for the purpose of suppressing cost and Cr poisoning, it is preferable that the amount of Cr is small. Therefore, the composition of Fe-18 to 22 Cr is preferable because a balance is adequate.

A ceramic material may be used as the main component of the material having the electron conductivity used in the cathode 20 and the anode 40. For example, it is possible to use $LaCrO_3$ in which Sr is doped, or $SrTiO_3$ in which La is doped. These materials are stable in reductive atmosphere and oxidizing atmosphere. That is, these materials are stable in a large range of oxygen partial pressure. These materials hardly react with other materials (for example, electrolyte). Therefore, these materials are suitable for a manufacturing process. Stability at a high temperature of the ceramic material is superior to those of the metal and the alloy. The ceramic material is preferable in an SOFC system having high endurance. For example, the material having the electron conductivity has conductivity of 10 $S \cdot cm^{-1}$ or more at a temperature of 400 degrees C. or more which is approximately equal to that of a metal.

The main component of the material having the oxygen ion conductivity of the cathode 20 is common with the main component of the material having the oxygen ion conductivity of the anode 40, when the material having the oxygen ion conductivity is different from the material having the electron conductivity and a plurality of materials having the oxygen ion conductivity are mixed and are used. In this case, it is preferable that the plurality of the materials having the oxygen ion conductivity of the cathode 20 are common with the plurality of the materials having the oxygen ion conductivity of the anode 40. The main component of the material having the electron conductivity of the cathode 20 is common with the main component of the material having the electron conductivity of the anode 40, when the material having the oxygen ion conductivity is different from the material having the electron conductivity and a plurality of materials having the electron conductivity are mixed and are used. In this case, it is preferable that the plurality of the materials having the electron conductivity of the cathode 20 are common with the plurality of the materials having the electron conductivity of the anode 40.

It is preferable that thicknesses of the cathode 20 and the anode 40 are 50 µm or less. It is more preferable that the thicknesses of the cathode 20 and the anode 40 are 30 µm or less. This is because a thickness of an electrode effectively contributing to electrochemical reaction when using reformed gas as fuel is approximately 30 µm, and an effective thickness of an electrode when using hydrocarbon fuel is approximately 50 µm.

The cathode 20 and the anode 40 may include catalyst. For example, Ni compound such as $Ni(NO_3)$ or $NiCl_3$ can be used as the catalyst of the cathode 20 and the anode 40. As a doping method of Ni, a method of impregnating solution such as $Ni(NO_3)$ or NiCl3 after firing may be used.

It is preferable that a main component of the solid oxide electrolyte layer 10 is such as $ZrO_2$ in which $Y_2O_3$ and $Sc_2O_3$ are doped. When a total concentration of $Y_2O_3$ and $Sc_2O_3$ is 6 mol % to 15 mol %, the oxygen ion conductivity is the highest. It is therefore preferable that the a material having the total concentration is used as the main component of the solid oxide electrolyte layer 10. It is preferable that the thickness of the solid oxide electrolyte layer 10 is 20 µm or less. It is more preferable that the thickness is 10 µm or less. The electrolyte layer has favorable performance when the electrolyte layer is thin. However, it is preferable that the thickness is 1 µm or more, from a viewpoint of suppressing gas leak of both sides of the electrolyte layer.

The first metal porous layer 30 and the second metal porous layer 50 are not limited. For example, a metal such as Ni may be used for the first metal porous layer 30 and the second metal porous layer 50. It is preferable that an alloy including one or more elements such as C, Si, Y, Ce, Cr, Fe, Ti, Cu, Mn, La, W, Ni, Zr or the like and including 10 wt % to 95 wt % of Cr and including another element of 30 wt % or less is used for the first metal porous layer 30 and the second metal porous layer 50. In concrete, Fe-18 to 22 Cr alloy may be used.

It is preferable that porosity of the metal porous part 30a and porosity of the metal porous part 50a are 30% or more and 70% or less. It is more preferable that the porosities are 40% or more and 60% or less. This is because gas diffusion is suppressed and generating of electrical power is suppressed, when the porosity is less than 30%. On the other hand, mechanical strength of the metal porous part is not sufficient and the metal porous part may not necessarily act as a support member of the gas passage, when the porosity is more than 70%. It is preferable that the thicknesses of the metal porous part 30a and the metal porous part 50a are 150 µm or less and 50 µm or more. It is more preferable that the thicknesses are 100 µm or less. When the thicknesses are small, a whole volume of the SOFC system is small and the SOFC system has advantage in downsizing. However, it is preferable that the thicknesses are 50 µm or more, from a viewpoint of securing of necessary amount of gas flow. The first metal porous layer 30 and the second metal porous layer 50 are support members for forming the gas passage. The thickness of the gas passage is approximately the same as the thicknesses of the first metal porous layer 30 and the second metal porous layer 50. An extinction material which disappears within a temperature range of 200 degrees C. to 600 degrees C. is used for the gas passage 30b and the gas passage 50b. Slurry including the extinction material is made and is printed by a line-and-space method. The extinction material is not limited. For example, an organic material such as acrylic resin may be used as the extinction material.

In the fuel cell stack 200 of the embodiment, the main component of the material having the oxygen ion conductivity and the main component of the material having the electron conductivity of the cathode 20 are common with those of the anode 40. In this case, the materials of the cathode 20 are similar to the materials of the anode 40. Therefore, bias of the contraction stress of the cathode 20 and the anode 40 is suppressed and crack is suppressed when removing the binder during firing of the cathode 20 and the anode 40. It is therefore possible to form the cell including the solid oxide electrolyte layer 10, the cathode 20 and the anode 40, by the printing technology and the lot firing technology. And it is possible to form the metal porous layers by the printing technology and the lot firing technology. It is therefore possible to downsize the fuel cell stack 200. When the fuel cell stack 200 is downsized, the number of stacking can be increased. It is therefore possible to achieve desirable amount of electrical power generation.

It is possible to manufacture the fuel cell stack 200 by a short process, when the layers of the fuel cell stack 200 are printed, stacked and lot-fired. It is therefore possible to reduce the manufacturing cost. When the volume of the system is reduced, material cost can be reduced. When ease of manufacture is taken into consideration and each cell area is 5 cm×5 cm, it is possible to reduce the area to ¼ of a product of which a cell area is 10 cm×10 cm. When the printing technology is used, it is possible to reduce the thickness of the fuel cell 100 to 0.25 mm. When the number of the stacked fuel cell 100 is 200, an SOFC system of which size is 5×5×5 m$^3$ is achieved. Even if the performance of the electrical power generation of each fuel cell 100 is degraded, total electrical power generation is 500 W when each output of the fuel cells 100 is 0.1 W/cm$^2$. In this case, two SOFC systems achieve 1 kW. In this case, it is possible to reduce the volume to approximately ¼ of the SOFC system of which electrical power generation is 1 kW order.

A description will be given of a manufacturing method of the fuel cell stack 200.

(Making process of a material for dense metal) Metal powder (for example, 1 μm to 10 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), a binder (PVB (polyvinylbutyral), acrylic resin, ethyl cellulose and so on) are mixed. Thus, slurry is made. An extinction material is not mixed, for the purpose of making a dense layer by sintering. The material for dense metal is used as the separator 60, the frame 31 and the frame 51. A volume ratio of organic component (solid material of the binder and the plasticizer) and the metal powder is, for example, 1:4 to 1:1.

(Making process of a material for porous metal) Metal powder (for example, 10 μm to 100 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), an extinction material (organic material), a binder (PVB, acrylic resin, ethyl cellulose or the like) are mixed. Thus, slurry is made. The material for porous metal is used as the first metal porous layer 30 and the second metal porous layer 50. A volume ratio of organic component (the extinction material, solid material of the binder and the plasticizer) and the metal powder is, for example, 1:1 to 20:1. The amount of the organic components is adjusted in accordance with the porosity.

(Making process of a material for gas passage) An extinction material (organic material such as acrylic resin or polyimide resin), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), a binder (PVB, acrylic resin, ethyl cellulose or the like) are mixed. Thus, slurry is made.

(Making process of a material for electrode layer) Powder of a material having electron conductivity (for example, 100 nm to 10 μm of grain diameter), powder of a material having oxygen ion conductivity (for example, 100 nm to 10 μm of grain diameter), catalyst (for example, Ni compound having a grain diameter of 10 nm to 1 μm, or the like), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), an extinction material (organic material), and a binder (PVB, acrylic resin, ethyl cellulose or the like) are mixed. Thus, slurry is made. A solvent such as Ni(NO$_3$)$_3$ or NiCl$_3$ may be impregnated after firing, as a doping method of Ni. A volume ratio of organic component (the extinction material, solid material of the binder and the plasticizer) and the powder of the material having electron conductivity is, for example, 1:1 to 5:1. The amount of the organic components is adjusted in accordance with the porosity. A volume ratio of the powder of the material having electron conductivity and the powder of the material having oxygen ion conductivity is, for example, 3:7 to 7:3.

(Making process of a material for dense mixed layer) Powder of a material having electron conductivity (for example, 1 μm to 10 μm of grain diameter), powder of a material having oxygen ion conductivity (for example, 10 nm to 10 μm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made. Neither catalyst nor an extinction material are mixed with the slurry, because the mixed layer has a purpose of not permeating gas.

(Making process of a material for electrolyte layer) Powder of a material having oxygen ion conductivity (for example, ScYSZ, YSZ or the like, and 10 nm to 1000 nm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made. A volume ratio of organic component (solid material of the binder and the plasticizer) and the powder of the material having oxygen ion conductivity is, for example, 6:4 to 3:4.

Figure 3A:
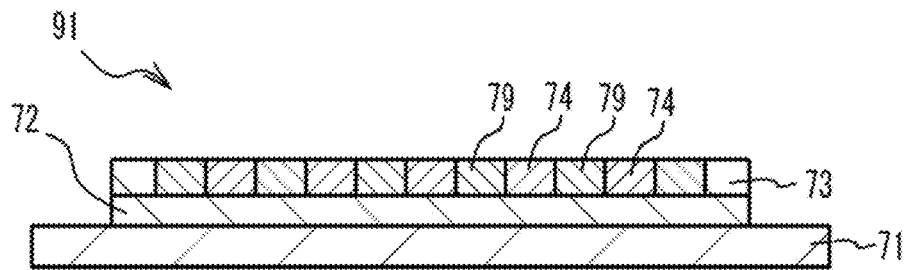
FIG. 3A and FIG. 3B illustrate a manufacturing method of a fuel cell stack.
Figure 3A:
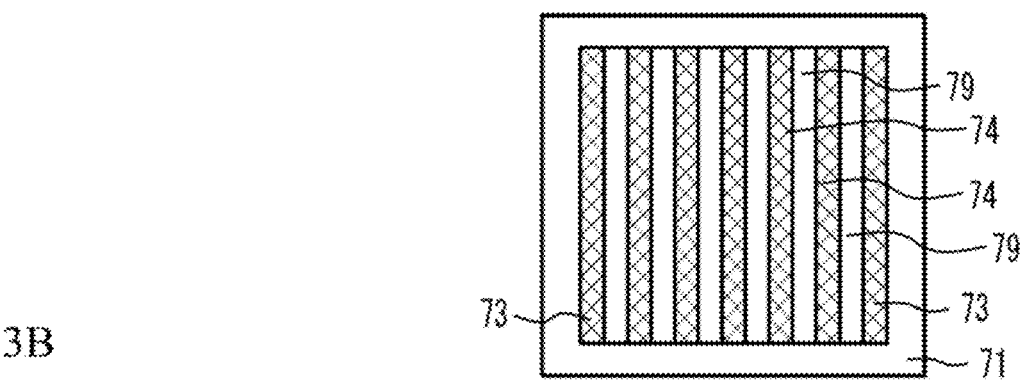

As illustrated in an upper figure of FIG. 3A, the material for dense metal is coated on a PET (polyethylene terephthalate) film 71. And a green sheet 72 for separator is formed. The green sheet 72 for separator has a rectangular shape and has a thickness of 20 μm to 35 μm. For example, the green sheet 72 for separator has a rectangular shape. For example, the green sheet 72 for separator has a square shape of which a side has a length of 60 mm to 70 mm. Next, the material for dense metal is printed on two end portions of the green sheet 72 for separator on the two side faces of the green sheet 72 for separator facing with each other. Thus, two frames 73 are formed. Each of the frames 73 has a width of 1 mm to 10 mm and has a length of 60 mm to 70 mm, in accordance with accuracy of stacking and cutting. Next, the material for porous metal and the material for gas passage are alternately printed between the two frames 73 on the green sheet 72 for separator, into a line-and-space shape. For example, a plurality of straight lines of the material for porous metal are printed in a predetermined interval. Thus, metal powder layers 74 are formed. Next, the material for gas passage is printed between the metal powder layers 74. Thus, gas passage layers 79 are formed. Thus, a first multilayer structure 91 is formed. A thickness of the frame 73 is, for example, 100 μm to 200 μm. A thickness of the metal powder layer 74 and a thickness of the gas passage layer 79 are ±10 μm with respect to the thickness of the frame 73. A right lower figure of FIG. 3A is a top view.

Figure 3B:
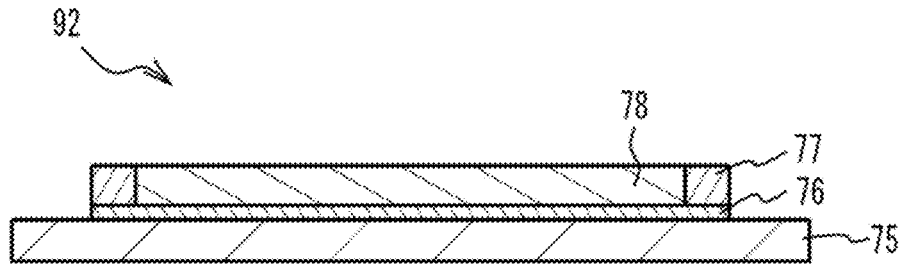
Figure 3B:
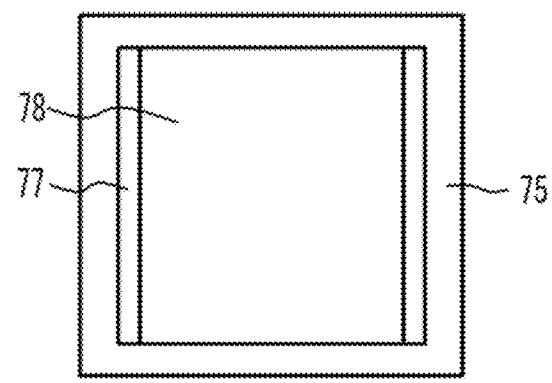

As illustrated in an upper figure of FIG. 3B, the material for electrolyte layer is coated on a PET film 75. Thus, an electrolyte layer 76 is formed. The electrolyte layer 76 has a rectangular shape which is approximately the same as the green sheet 72 for separator and has a thickness of 5 μm to 15 μm. Next, the material for dense mixed layer is printed on end portions of the electrolyte layer 76 on the two side faces side of the electrolyte layer 76 facing with each other. Thus, two frames 77 are formed. The frames 77 have a width of 1 mm to 10 mm and have a length of 60 mm to 70 mm, in accordance with accuracy of stacking and cutting. Next, the material for electrode layer is printed between the two frames 77 on the electrolyte layer 76. Thus, an electrode layer 78 (a reverse pattern layer with respect to the frame 77) is formed. Thus, a second multilayer structure 92 is formed. A thickness of the frame 77 is, for example, 15 μm to 40 μm. A thickness of the electrode layer 78 is, for example, ±3 μm with respect to the thickness of the frame 77. A right lower figure of FIG. 3B is a top view.

Figure 4A:
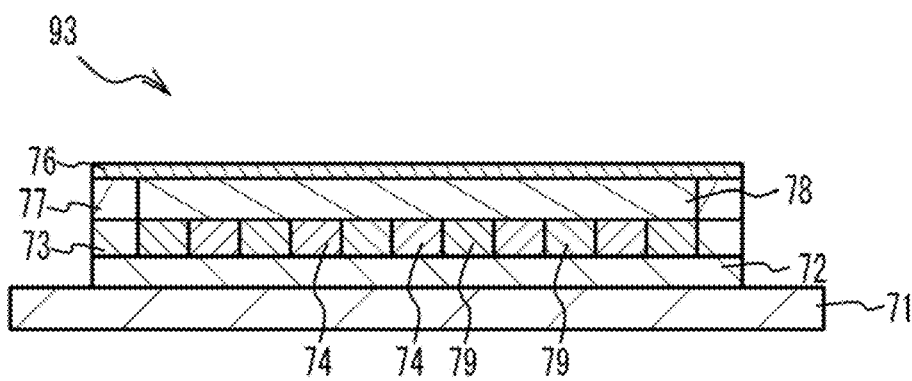
FIG. 4A to FIG. 4C illustrate a manufacturing method of a fuel cell stack.

Next, as illustrated in FIG. 4A, the first multilayer structure 91 is stacked on the second multilayer structure 92. In this case, the second multilayer structure 92 is reversed so that the electrode layer 78 is stacked on the metal powder layer 74. And, the frame 77 is stacked on the frame 73. Thus, a third multilayer structure 93 is formed. The PET 75 is peeled.

Figure 4B:
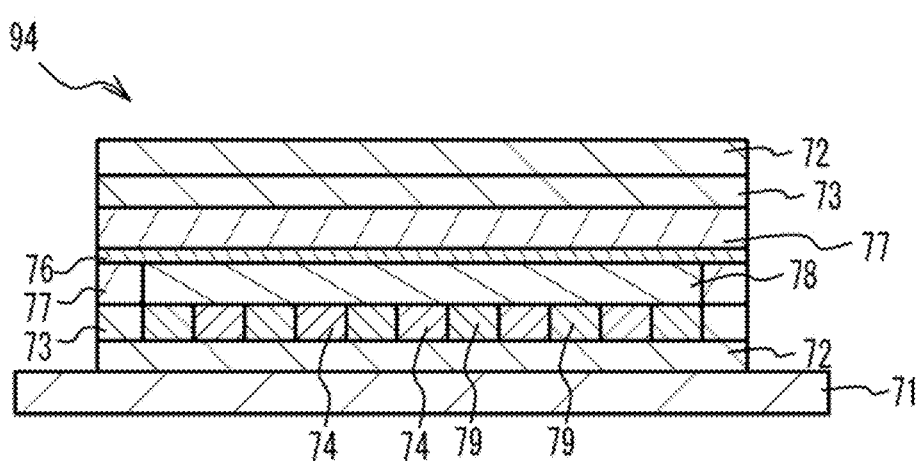

Next, as illustrated in FIG. 4B, another third multilayer structure 93 is stacked on the third multilayer structure 93 so that another electrolyte layer 76 is stacked on the electrolyte layer 76. Another third multilayer structure 93 is rotated by 90 degrees, with the two electrolyte layers 7 facing with each other. That is, side faces of the third multilayer structure 93 on which the frames 73 and the frames 77 are provided are different from side faces of another third multilayer structure 93 on which the frames 73 and the frames 77 are provided. Thus, a fourth multilayer structure 94 is formed.

Figure 4C:
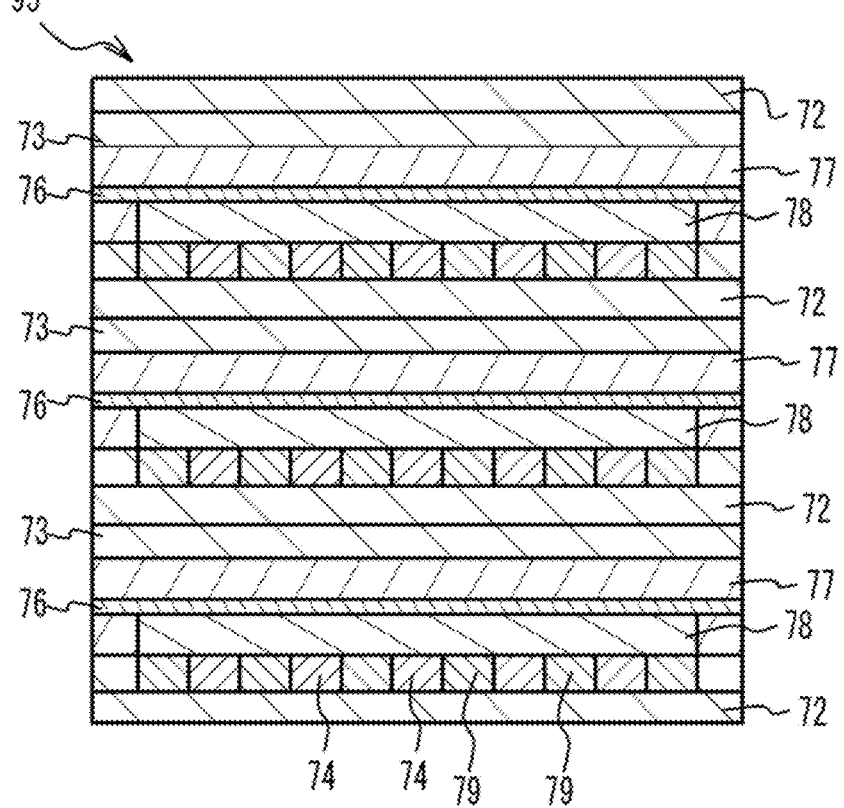

Next, the PET film 71 is peeled. And, as illustrated in FIG. 4C, a plurality of the fourth multilayer structures 94 (for example, 200) are stacked. Thus, a compact 95 is formed. In the compact 95, the electrolyte layer 76 corresponds to the solid oxide electrolyte layer 10 after firing. The electrode layer 78 on the upper face (first face) of the electrolyte layer 76 corresponds to the cathode 20 after firing. The metal powder layer 74 on the electrode layer 78 corresponds to the first metal porous layer 30 after firing. The electrode layer 78 on the lower face (second face) of the electrolyte layer 76 corresponds to the anode 40 after firing. The metal powder layer 74 under the electrode layer 78 corresponds to the second metal porous layer 50 after firing. The metal powder layer 74 under the electrode layer 78 corresponds to the second metal porous layer 50 after firing. The green sheet 72 for separator corresponds to the separator 60 after firing.

The compact 95 is subjected to isostatic pressing at a pressure of 100 MPa or the like. Thereby, each layer adheres to each other. The compact is cut into a square of which a side has a length of 60 mm to 65 mm. After that, the binder is removed in normal atmosphere. The organic components are slowly decomposed in a temperature range of 200 degrees C. to 700 degrees C. Therefore, the temperature is slowly increased to the temperature range of 200 degrees C. to 700 degrees C. in a week, in order to suppress defect of the removing of the binder. After that, the temperature is kept at 700 degrees C. for one hour or the like.

The compact 95 of which the binder is removed is supplied in a reduction firing furnace and is fired in a reductive atmosphere of 100% $H_2$, or a reductive atmosphere of 0.1% to 4% $H_2$ and Ar. A known manufacturing method of an SOFC stack by a lot firing may be applied. That is, the firing is performed so that at least one of the metal and the ceramic material is sintered, and a desirable sintered dense structure or a sintered porous structure is formed. It is preferable that all elements are fired together with each other. For example, a heating process in a temperature range of 1200 degrees C. to 1550 degrees C. may be used It is preferable that the temperature range is 1250 degrees C. to 1400 degrees C. A firing time within the temperature range is not limited. When the elements are slowly fired, a difference of contraction of the layers is suppressed. For example, the firing time may be a few hours to a few tens of hours. The gas passage layer 79 disappears in one of heating processes.

After that, the catalyst is impregnated into the cathode 20 and the anode 40, if necessary. Thus, the fuel cell stack 200 is manufactured. For example, when the catalyst is impregnated into the anode 40, the cathode 20 is covered with a masking tape. A solvent of nickel nitrate or nickel chloride is impregnated into the anode 40. And the anode 40 is dried. On the other hand, a solvent of precursor of nitrate to be Ag nitrate, Pr nitrate, LSM, LSC or LSCF is impregnated into the cathode 20 and is dried. After that, the fuel cell stack 200 is subjected to a heating process of 300 degrees C. to 850 degrees C. in normal atmosphere. The impregnated solvent is decomposed and is reacted with each other. Thus, a desirable catalyst is obtained.

In the manufacturing method, the main component of the material having the oxygen ion conductivity and the main component of the material having the electron conductivity of the electrode layer 78 for the cathode 20 are common with those of the electrode layer 78 for the anode 40. In this case, the materials of the cathode 20 are similar to the materials of the anode 40. Therefore, bias of the contraction stress of the cathode 20 and the anode 40 is suppressed and crack is suppressed when removing the binder during firing of the cathode 20 and the anode 40. It is therefore possible to form the cell including the solid oxide electrolyte layer 10, the cathode 20 and the anode 40, by the printing technology and the lot firing technology. And it is possible to form the first metal porous layer 30 and the second metal porous layer 50 by the printing technology and the lot firing technology. It is therefore possible to downsize the fuel cell 100 and the fuel cell stack 200. When the fuel cell 100 and the fuel cell stack 200 are downsized, the number of stacking can be increased. It is therefore possible to achieve desirable amount of electrical power generation.

It is possible to manufacture the fuel cell stack 200 by a short process, when the layers of the fuel cell stack 200 are printed, stacked and lot-fired. It is therefore possible to reduce the manufacturing cost. When the volume of the system is reduced, material cost can be reduced. When ease of manufacture is taken into consideration and each cell area is 5 cm×5 cm, it is possible to reduce the area to ¼ of a product of which a cell area is 10 cm×10 cm. When the printing technology is used, it is possible to reduce the thickness of the fuel cell 100 to 0.25 mm. When the number of the stacked fuel cell 100 is 200, an SOFC system of which size is 5×5×5 cm$^3$ is achieved. Even if the performance of the electrical power generation of each fuel cell 100 is degraded, total electrical power generation is 500 W when each output of the fuel cells 100 is 0.1 W/cm$^2$. In this case, two SOFC systems achieve 1 kW. In this case, it is possible to reduce the volume to approximately ¼ of the SOFC system of which electrical power generation is 1 kW order.

EXAMPLE

The fuel cell stack 200 was manufactured in accordance with the above-mentioned embodiment. Fe—Cr alloy powder having a diameter of 20 μm was used as the material for dense metal. Fe—Cr alloy powder having a diameter of 20 μm was used as the material for porous metal. Acrylic resin was used as the material for gas passage. Fe—Cr alloy powder having a diameter of 5 μm and 10Sc1YSZ powder having a diameter of 100 nm were used as the material for electrode layer. Fe—Cr alloy powder having a diameter of 5 μm and 10Sc1YSZ powder having a diameter of 100 nm were used as the material for dense mixed layer. 10Sc1YSZ powder having a diameter of 100 nm was used as the material for electrolyte layer. 200 numbers of the fuel cells 100 were stacked. Thus, the fuel cell stack 200 was manufactured. After firing, the thickness of the solid oxide electrolyte layer 10 was approximately 5 μm. The thickness of the cathode 20 and the anode 40 was approximately 20 μm. The thickness of the metal porous part 30a and the gas passage 30b were approximately 95 μm for the purpose of flowing air. The thickness of the metal porous part 50a and the gas passage 50b was approximately 70 μm for the purpose of flowing fuel gas. The separator 60 was dense and had a thickness of approximately 40 μm. The thickness of the fuel cell 100 was approximately 0.25 mm. The size of the fuel cell stack 200 was 5 cm×5 cm×5 cm. Crack did not occur.

It is thought that this was because deformation caused by contraction during removing of the binder and the firing was suppressed, because the main component of the material having the oxygen ion conductivity of the cathode 20 was common with that of the anode 40, and the main component of the material having the electron conductivity of the cathode 20 was common with that of the anode 40.

Although the embodiments of the present invention have been described in detail, it is to be understood that the various change, substitutions, and alterations could be made hereto without departing from the spirit and scope of the invention.

What is claimed is:

1. A fuel cell comprising:
a solid oxide electrolyte layer having oxygen ion conductivity;
a first electrode layer that is provided on a first face of the solid oxide electrolyte layer;
a second electrode layer that is provided on a second face of the solid oxide electrolyte layer;
a first metal porous layer that is provided on a face of the first electrode layer which is opposite to the solid oxide electrolyte layer; and
a second metal porous layer that is provided on a face of the second electrode layer which is opposite to the solid oxide electrolyte layer,
wherein the first electrode layer has a first material having both electron conductivity and oxygen ion conductivity and
wherein the second electrode layer has a second material having both electron conductivity and oxygen ion conductivity and
wherein the first material and the second material are a LaCoO$_3$-based material or a CeO$_2$-based material in which Gd is doped,
wherein the first material and the second material have an identical composition,
wherein the solid electrolyte layer, the first electrode layer, and the second electrode layer constitute a multilayer structure which has a rectangular parallelepiped shape which has an upper face and a lower face in a stacking direction of the multilayer structure, and four side faces other than the upper face and the lower face,
wherein the four side faces consists of a first side face, a second side face opposite the first side face, a third side face, and a fourth side face opposite the third side face, and
wherein frames are provided at the first side face, the second side face, the third side face, and the fourth side face, respectively, on planes on which the first electrode layer and the second electrode layer are provided, respectively,
among the frames,
first frames are provided at the first side face and the second side face, respectively,
second frames are provided on the third side face and the fourth side face, respectively, and
the first frames and the second frames are alternately provided in the stacking direction in a manner that
the first frames and the first electrode layer are provided on a first plane on a same side thereof where the first electrode layer is provided,
the second frames and the second electrode layer are provided on a second plane on a same side thereof where the second electrode layer is provided,
wherein the first frames extend continuously from the third side face to the fourth side face along a first direction in which the third side face and the fourth side face are opposite to each other, and have a constant width perpendicular to the first direction from the third side face to the fourth side face,
wherein the second frames extend continuously from the first side face to the second side face along a second direction in which the first side face and the second side face are opposite to each other, and have a constant width perpendicular to the second direction from the first side face to the second side face,
wherein the first metal porous layer has a structure including a plurality of metal porous parts and a plurality of groove-shaped gas passages which are alternately arranged, respectively, in the second direction in a manner that adjacent two of the plurality of groove-shaped gas passages are separated from each other by one of the plurality of metal porous parts, and adjacent two of the plurality of metal porous parts are separated from each other by one of the plurality of groove-shaped gas passages, wherein the plurality of metal porous parts and the plurality of groove-shaped gas passages each extend continuously from the third side face to the fourth side face, and wherein the second metal porous layer has a structure including a plurality of metal porous parts and a plurality of groove-shaped gas passages which are alternately arranged, respectively, in the first direction in a manner that adjacent two of the plurality of groove-shaped gas passages are separated from each other by one of the plurality of metal porous parts, and adjacent two of the plurality of metal porous parts are separated from each other by one of the plurality of groove-shaped gas passages, wherein the plurality of metal porous parts and the plurality of gas passages each extend continuously from the first side face to the second side face.

2. The fuel cell as claimed in claim 1, wherein the first electrode layer and the second electrode layer have a thickness of 50 μm or less.

3. The fuel cell as claimed in claim 1, wherein a porosity of the metal porous part is 30% or more and 70% or less.

4. The fuel cell as claimed in claim 1, wherein thicknesses of the first metal porous layer and the second metal porous layer are 150 μm or less and 50 μm or more.

5. A fuel cell stack comprising:
a plurality of fuel cells that are claimed in claim 1 and are stacked through a separator of a metal.

6. The fuel cell as claimed in claim 1, wherein each of the first electrode layer and the second electrode layer is a sintered layer.

7. The fuel cell as claimed in claim 1,
wherein the two first frames cover entirely a first side face of the first electrode layer facing the first side face of the multilayer structure and a second side face of the first electrode layer facing the second side face of the multilayer structure, respectively, wherein a third side face of the first electrode layer facing the third side face of the multilayer structure and a fourth side face of the first electrode layer facing the fourth side face of the multilayer structure are not entirely covered by a frame, wherein the two second frames cover entirely a third side face of the second electrode layer facing the third side face of the multilayer structure and a fourth side face of the second electrode layer facing the fourth side face of the multilayer structure, respectively, wherein a first side face of the second electrode layer facing the first side face of the multilayer structure and a second side face of the second electrode layer facing the second side face of the multilayer structure are not entirely covered by a frame.

8. The fuel cell as claimed in claim 1,
wherein the first material and the second material are $LaCoO_3$-based material.

* * * * *